United States Patent Office 3,531,245
Patented Sept. 29, 1970

3,531,245
MAGNESIUM-ALUMINUM NITRIDES
John W. Dietz, Wilmington, Del., assignor to E. I. du Pont de Nemours and Company, Wilmington, Del., a corporation of Delaware
No Drawing. Filed Apr. 1, 1968, Ser. No. 717,901
Int. Cl. C01b *21/06;* C22c *29/00*
U.S. Cl. 23—192                                   20 Claims

ABSTRACT OF THE DISCLOSURE

Ternary nitrides of magnesium and aluminum, such as $Mg_3AlN_3$, $Mg_3Al_2N_4$ or $Mg_3Al_3N_5$, prepared by heating a mixture of fine magnesium metal powder and fine aluminum metal powder in an atmosphere of ammonia or nitrogen, are useful as a high temperature refractory material particularly in contact with molten metals.

BACKGROUND OF THE INVENTION

This invention relates to ternary nitrides and is more particularly directed to magnesium-aluminum nitrides, to methods of preparing magnesium-aluminum nitrides and to use of the nitrides as high temperatures refractories.

Complex refractory compounds such as oxides and carbides are known to the art. However, few ternary nitrides have been prepared because it is difficult to prepare a ternary nitride by simply heating a mixture of the individual nitrides. Such a process ordinarily results in decomposition of the individual nitrides before a temperature is reached at which diffusion and solution of the two nitrides can occur. It is difficult to prepare the ternary nitrides of this invention by such a method. It is also very difficult to prepare the ternary magnesium-aluminum nitride from a mixture of powdered magnesium and aluminum because of their tendency to form AlN, and $Mg_3N_2$ which tends to decompose before a temperature is reached at which diffusion and solution of the two nitrides can occur.

I have discovered that magnesium-aluminum nitrides can be prepared by heating an intimate mixture of very fine magnesium powder and very fine aluminum powder in an atmosphere of ammonia or nitrogen in such a manner that the metal alloy is formed before the metals are nitrided.

By such a procedure ternary magnesium-aluminum nitrides can be obtained in good yield with only minor amounts of impurities.

SUMMARY OF THE INVENTION

In summary this invention is directed to ternary magnesium-aluminum nitrides of the formulae: $Mg_3AlN_3$, $Mg_3Al_2N_4$, $Mg_3Al_3N_5$ and their mixtures, and to methods of preparing these ternary nitrides by (a) homogeneously intermixing magnesium powder with aluminum powder, the powders having an average particle size of less than 300 microns;

(b) heating the powder mixture to a temperature of from 600 to 800° C. in a nitrogen or ammonia atmosphere until most of the metal has been alloyed and then heating the powder to a temperature above 800° C. in an atmosphere of nitrogen or ammonia until nitriding is essentially complete.

Surprisingly, this process results in ternary magnesium-aluminum nitrides containing only minor amounts of impurities such as magnesium nitride or oxide and aluminum nitride. These ternary magnesium-aluminum nitrides are useful as pressing aids in aluminum nitride compositions and as high temperature refractories especially for contact with molten metals.

DESCRIPTION OF THE INVENTION

Compounds

The ternary nitrides of this invention are magnesium-aluminum nitrides of the formulae: $Mg_3AlN_3$, $Mg_3Al_2N_4$, and $Mg_3Al_3N_5$ and their mixtures.

These ternary compounds correspond on a molar basis to magnesium, aluminum and nitrogen in the following proportions: $Mg_3N_2 \cdot AlN$, $Mg_3N_2 \cdot (AlN)_2$, and $Mg_3N_2 \cdot (AlN)_3$ and their mixtures. However, it is clear from X-ray analysis that the products of this invention are not merely mechanical mixtures of magnesium nitride and aluminum nitride.

The crystal structures of the three forms of magnesium-aluminum nitride of this invention are hexagonal. The crystal structures have the dimensions listed below and the ternary nitrides have the lattice spacings as measured by X-ray analysis as shown in Table I.

CRYSTAL DIMENSIONS

|  | a (A.) | c (A.) | Molar volume (A.³) |
|---|---|---|---|
| $Mg_3AlN_3$ | 3.358 | 8.487 | 82.88 |
| $Mg_3Al_2N_4$ | 3.281 | 10.761 | 100.32 |
| $Mg_3Al_3N_5$ | 3.244 | 13.182 | 120.14 |

TABLE I

Observed Spacings and Relative Intensities for $Mg_3AlN_3$, $Mg_3Al_2N_4$, and $Mg_3Al_3N_5$

| d (A.) | $Mg_3AlN_3$ | $Mg_3Al_2N_4$ | $Mg_3Al_3N_5$ |
|---|---|---|---|
| 13.192 |  |  | W |
| 10.653 |  | W |  |
| 8.425 | W |  |  |
| 6.607 |  |  | W |
| 5.372 |  | W |  |
| 4.230 | M |  |  |
| 3.562 |  | W |  |
| 3.290 |  |  | W |
| 2.894 | M |  |  |
| 2.836 | S | S |  |
| 2.805 |  |  | S |
| 2.747 | S | S | S |
| 2.693 |  |  | M |
| 2.673 |  | M |  |
| 2.622 |  |  | M |
| 2.571 |  |  | M |
| 2.513 |  | M |  |
| 2.475 |  |  | M |
| 2.372 |  | W |  |
| 2.362 |  |  | M |
| 2.271 | M |  |  |
| 2.254 |  |  | S |
| 2.226 |  | S |  |
| 2.196 |  |  | S |
| 2.152 | M | M |  |
| 2.139 |  |  | M |
| 2.121 | M |  |  |
| 2.023 | W |  |  |
| 2.023 |  |  | W |
| 1.952 |  | M |  |
| 1.924 |  |  | M |
| 1.917 | M |  |  |
| 1.821 |  |  | W |
| 1.814 | W |  |  |
| 1.731 |  |  | M |
| 1.712 | W | W |  |
| 1.680 | M |  |  |
| 1.642 |  |  | W |
| 1.640 |  | S |  |
| 1.624 | M |  |  |
| 1.622 |  |  | S |
| 1.561 | W |  | W |
| 1.542 | W |  |  |
| 1.515 |  | M |  |
| 1.492 |  |  | M |
| 1.489 |  | W |  |
| 1.447 | W | W |  |
| 1.421 |  | W |  |
| 1.420 |  |  | W |
| 1.409 |  | W |  |
| 1.406 |  |  | W |
| 1.402 |  |  | W |
| 1.400 | W | W |  |
| 1.379 |  |  | W |
| 1.372 | W |  |  |
| 1.359 |  |  | M |
| 1.352 | M | M |  |
| 1.341 |  |  | W |
| 1.332 | W |  |  |
| 1.319 | M | M | M |
| 1.308 |  |  | S |
| 1.304 |  | M |  |

Where: W = weak; M = medium; S = strong.

From the spacing and intensities shown in Table 1 it is seen that the ternary nitrides of this invention can be characterized as follows:

$Mg_3AlN_3$ can be characterized by the following lattice spacings and intensities:

| $d$ (A.) | Strength |
|---|---|
| 8.425 | W |
| 4.230 | M |
| 2.894 | M |
| 2.836 | S |
| 2.747 | S |
| 2.271 | M |
| 2.152 | M |
| 2.121 | M |
| 2.028 | W |
| 1.917 | M |
| 1.814 | W |
| 1.712 | W |
| 1.680 | M |
| 1.624 | M |
| 1.561 | W |
| 1.542 | W |
| 1.447 | W |
| 1.400 | W |
| 1.352 | M |
| 1.332 | W |
| 1.319 | M | where

W=Weak.
M=Medium.
S=Strong.

$Mg_3Al_2N_4$ can be characterized by the following lattice spacings and intensities:

| $d$ (A.) | Strength |
|---|---|
| 10.653 | W |
| 5.372 | W |
| 3.562 | W |
| 2.836 | S |
| 2.747 | S |
| 2.673 | M |
| 2.513 | M |
| 2.372 | W |
| 2.226 | S |
| 2.152 | M |
| 1.952 | M |
| 1.712 | W |
| 1.640 | S |
| 1.515 | M |
| 1.489 | W |
| 1.447 | W |
| 1.421 | W |
| 1.409 | W |
| 1.400 | W |
| 1.372 | W |
| 1.352 | M |
| 1.319 | M |
| 1.304 | M | where

W=Weak.
M=Medium.
S=Strong.

$Mg_3Al_3N_5$ can be characterized by the following lattice spacings and intensities:

| $d$ (A.) | Strength |
|---|---|
| 13.192 | W |
| 6.607 | W |
| 3.290 | W |
| 2.805 | S |
| 2.747 | S |
| 2.693 | M |
| 2.622 | M |
| 2.571 | M |
| 2.475 | M |
| 2.362 | M |
| 2.254 | S |
| 2.196 | S |
| 2.139 | M |
| 2.023 | W |
| 1.924 | M |
| 1.821 | W |
| 1.731 | M |
| 1.642 | W |
| 1.622 | S |
| 1.561 | W |
| 1.492 | M |
| 1.420 | W |
| 1.406 | W |
| 1.402 | W |
| 1.379 | W |
| 1.359 | M |
| 1.341 | W |
| 1.319 | M |
| 1.308 | S | where

W=Weak.
M=Medium.
S=Strong.

The ternary magnesium-aluminum nitrides of this invention can be prepared by intimately and homogeneously inter-mixing a fine magnesium powder with a fine aluminum powder and heating the mixed powder in an atmosphere of nitrogen or ammonia at a temperature between 600° C. and 800° C. until the magnesium-aluminum alloy is formed and then completing the nitriding at a temperature above 800° C.

The magnesium and aluminum powders suitable for use in the process of this invention must have an average particle size of less than 300 microns as measured on a Fisher Subsieve Sizer, to avoid excessive formation of the individual metal nitrides. The powders preferably have an average particle size below 150 microns and most preferably below 44 microns. The finer particle sizes insure greater homogeneity of mixture and minimum formation of the individual metal nitrides. These powders are available commercially and can be prepared by means well known in the art.

The metal powders can be mixed in any conventional dry-powder blender, such as a "V" blender, cone blender or ribbon blender. The ratio of magnesium to alumnium in the mixed powder will be determined by the molar ratio desired in the end product. Thus, a 3:1 ratio of magnesium:aluminum will be used when the product desired is $Mg_3AlN_3$. Similarly, ratios of 3:2 and 1:1 will be used when the product desired is $Mg_3Al_2N_4$ and $Mg_3Al_3N_5$ respectively. While the product of the process of this invention will ordinarily consist of a mixture of the three magnesium-aluminum nitrides the relative amounts of the three complex nitrides can be largely controlled by the ratio of metals in the starting powders.

The mixed powders are initially heated to a temperature between 600° C. and 800° C. in a stream of nitrogen or ammonia for time sufficient to convert most of the metals to magnesium-aluminum alloy. It is preferred at this stage to use ammonia as it results in a more finely divided product than does the use of nitrogen.

The powder can be heated at any temperature between 600° C. and 800° C. to achieve the desired alloying of magnesium and aluminum, or it can be heated through the range of 600° to 800° C. either at a uniform rate or stepwise. Thus in a preferred procedure the heat is applied in such a fashion that the temperature is raised from 600° C. to 800° C. in a period of from 1 to 10 hours. A more preferred method is to heat at 600° C. for one hour, raise the temperature to 700° C. and hold for one hour and then raise the temperature to 800° C. and hold it there for one hour. At the end of this heat treatment the mixture contains essentially no magnesium metal and little aluminum metal and magnesium nitride. The bulk of the metal at this stage is partially nitrided magnesium-aluminum alloy.

Before the nitriding is completed at a temperature above 800° C. the product of the above heating step is preferably disaggregated, such as by screening, to insure a fine product at the conclusion of the second heating step. If, on the other hand, a fine powder is not desired the second heating step can follow immediately after the first heating step.

The temperature to which the powder is heated in the second heating step can range from above 800° C. to about 1450° C. Ordinarily the powder is heated to about 900° C.–1200° C. in an atmosphere of ammonia or nitrogen for about two hours. Nitrogen is preferred for this second heating step because it is cheaper and easier to handle than ammonia.

The higher the temperature during the second heating step the coarser the final product. Similarly, the longer the second heating step the coarser the final product. The second heating step can be of as little as an hours duration or it can be carried on for several days depending on the temperature used and the coarseness desired in the end product.

After cooling, the product of this process is ordinarily found to contain only small amounts of oxygen as a significant impurity. Surface area of the product powder will ordinarily range between 0.1 and 5 square meters per gram although lower and higher surface areas can be achieved by the above-described methods. The crystal structure of the ternary magnesium-aluminum nitrides are as described previously.

An obvious alternative to the above-described procedure is to start the process with a finely powdered magnesium-aluminum alloy. It can be treated in essentially the same fashion as the mixture of magnesium and aluminum powders although it is not necessary that any care be taken to promote alloying when prealloyed material is used. The magnesium-aluminum alloy can contain ratios of magnesium to aluminum calculated to give the desired ratio in the final product as mentioned above.

Still another alternative is to start the above reaction by mixing a fine aluminum nitride powder with fine magnesium metal powder. However, the reaction is slower when these starting materials are used and generally is more difficult to get to completion.

Still another alternative is to start the above reaction with a mixture of finely powdered magnesium metal, aluminum metal and aluminum nitride. The resulting product is a mixture of aluminum nitride AlN and ternary magnesium-aluminum nitride.

The product powders of the above process can be compacted by hot pressing at 1600–1800° C. and 1000–4000 p.s.i. for from 2–15 minutes. They can also be densified by forming the product of the first heating step into a desired shape such as by pressing in a die after incorporating a non-reactive volatile binder, and then heating the formed shape in nitrogen at about 1200° C. to simultaneously sinter and complete nitriding of the magnesium-aluminum alloy. Such techniques produce coherent refractory bodies suitable for high temperature uses such as crucibles.

This invention is further illustrated by the following examples wherein parts and percentages are by weight unless otherwise noted.

Example 1

A mixture of 72.9 parts of −325 mesh magnesium powder and 41.0 parts of aluminum nitride (100 m$\mu$ crystallite size) is prepared by dry milling with tungsten carbide balls for one hour in a steel mill. A molybdenum boat containing 112 parts of the above mixture is placed in a silica tube furnace. Ammonia is passed over the mixture at a flow rate of .76 parts per hour, and the furnace is heated to 600° C. for one hour and to 800° C. for three hours. After the furnace has cooled to room temperature, the product is removed, weighed in air, and transferred to a dry box in a nitrogen atmosphere. At this point there are 140 parts of product.

The product is disaggregated by passing it through a 14-mesh screen. It is then placed in a molybdenum boat in a ceramic tube furnace and heated in an atmosphere of nitrogen to 1200° C. and held there for four hours. At this point 98 parts of product are recovered, the remainder having sublimed out of the heat zone during the final heat treatment. The 98 parts of product represent a yield of 70% calculated as 100 times the recovered weight divided by the weight which would have been recovered if all the magnesium had been nitrided and no product had been lost. This product is found by X-ray analysis to be a mixture of the magnesium-aluminum nitrides, $Mg_3AlN_3$, $Mg_3Al_2N_4$, and $Mg_3Al_3N_5$, and aluminum nitride. No free magnesium nitride is detected.

Example 2

A mixture of 48 parts of −325 mesh magnesium powder and 54 parts of −325 mesh aluminum powder is treated as was the starting mixture in Example 1. One hundred and twenty-eight parts of product are recovered and are found by X-ray and electron diffraction analysis to be primarily $Mg_3Al_3N_5$, containing some AlN and a small amount of MgO. The 128 parts of product represent a yield of 85% calculated as in Example 1. By chemical analysis, the product is found to contain 35.76% Mg, 35.91% Al, and 28.0% N.

Example 3

A mixture of 75.6 parts of −325 mesh aluminum powder and 29.2 parts of −325 mesh magnesium powder is treated as in Example 2. The product is found by chemical analysis to contain 16.0% Mg, 46.7% Al, and 32.5% N. By electron diffraction and X-ray analysis, the product is found to be a mixture of $Mg_3Al_3N_5$ and AlN with a small amount of MgO.

Example 4

A mixture of 32.4 parts of −325 mesh aluminum powder and 68.1 parts of −325 mesh magnesium powder is treated as in Example 2. The product by chemical analysis is found to contain 33.3% Mg, 24.5% Al, and 27.0% N. By electron diffraction and X-ray analysis, the product is found to be a mixture of $Mg_3N_2$ and $Mg_3AlN_3$, with a lesser amount of $Mg_3Al_2N_4$.

Example 5

A magnesium aluminum alloy containing 48 parts of magnesium and 54 parts of aluminum is crushed in a jaw-crusher. It is then ball milled to a fine powder using 4 parts of stearic acid as a milling aid. This alloy powder is then treated as in Example 1, with the difference that the final heating step is performed at 1400° C. The product is found by X-ray and electron diffraction analysis to be primarily $Mg_3Al_3N_5$ containing a small amount of MgO.

Example 6

Two and six-tenths parts of the powder product from Example 2 is loaded into a ½ inch diameter graphite die and hot pressed by heating to 1800° C. and applying 4000 p.s.i.g. pressure for six minutes. The entire hot pressing operation is performed in an atmosphere of argon. The resulting solid body, primarily $Mg_3Al_3N_5$, shows a weight gain of 6% when exposed to air at 1050° C. for one hour.

The hot pressed body is an electrical insulator.

I claim:
1. Magnesium-aluminum nitrides of the formulae:

$$Mg_3AlN_3$$
$$Mg_3Al_2N_4$$
$$Mg_3Al_3N_5$$

and their mixtures.

2. Magnesium-aluminum nitride of the formula $$Mg_3AlN_3$$

3. Magnesium-aluminum nitride of the formula $$Mg_3Al_2N_4$$

4. Magnesium-aluminum nitride of the formula $$Mg_3Al_3N_5$$

5. The method of preparing magnesium-aluminum nitride powder comprising:
  (a) homogeneously intermixing magnesium powder with a powder selected from the group consisting of aluminum nitride powder and aluminum powder, the powders each having an average particle size of less than 300 microns;
  (b) heating the mixed powders to a temperature of from 600° C. to 800° C. in an atmosphere selected from the group consisting of nitrogen, ammonia and their mixture, until most of the metal has formed a magnesium-aluminum alloy; and
  (c) heating the alloy powder of step (b) to a temperature above 800° C. and below 1450° C. in an atmosphere selected from the group consisting of nitrogen, ammonia and their mixture, until nitriding is essentially complete.

6. The method of claim 5 in which the starting powders have an average particle size of less than 150 microns.

7. The method of claim 5 in which the starting powders have an average particle size of less than 44 microns.

8. The method of claim 5 in which the atmosphere in step (b) is an ammonia atmosphere.

9. The method of claim 5 in which the atmosphere in step (c) is a nitrogen atmosphere.

10. The method of claim 5 in which the product of step (b) is disaggregated before step (c) is performed.

11. The method of claim 5 in which the temperature in step (c) is about 1200° C.

12. The method of claim 10 in which the starting powders have an average particle size of less than 44 microns, the atmosphere in step (b) is an ammonia atmosphere, and the atmosphere in step (c) is a nitrogen atmosphere.

13. The method of preparing magnesium-aluminum nitride powder comprising (a) heating a fine powder selected from the group consisting of a mixture of aluminum and magnesium powders; a mixture of aluminum nitride and magnesium powders; a mixture of aluminum nitride, aluminum and magnesium powders; and powdered aluminum-magnesium alloy, to a temperature of from 600 to 800° C. in an atmosphere selected from the group consisting of ammonia, nitrogen and their mixture, until most of the metal is present as magnesium-aluminum alloy, and then (b) heating the alloy powder to a temperature above 800° C. and below 1450° C. in an atmosphere selected from the group consisting of nitrogen, ammonia and their mixture, until nitriding is essentially complete; the starting powders all having an average particle size of less than 300 microns.

14. The method of claim 13 in which the starting powders have an average particle size of less than 150 microns.

15. The method of claim 13 in which the starting powders have an average particle size of less than 44 microns.

16. The method of claim 13 in which the atmosphere in step (a) is an ammonia atmosphere.

17. The method of claim 13 in which the atmosphere in step (b) is a nitrogen atmosphere.

18. The method of claim 13 in which the product of step (a) is disaggregated before step (b) is performed.

19. The method of claim 13 in which the temperature in step (b) is about 1200° C.

20. The method of claim 18 in which the starting powders have an average particle size of less than 44 microns, the atmosphere in step (a) is an ammonia atmosphere, and the atmosphere in step (b) is a nitrogen atmosphere.

References Cited

UNITED STATES PATENTS 3,238,018   3/1966   Winter et al. _____ 23—192

OSCAR R. VERTIZ, Primary Examiner

C. B. RODMAN, Assistant Examiner

U.S. Cl. X.R.

23—191; 106—58